(12) United States Patent
Wu

(10) Patent No.: US 10,170,972 B2
(45) Date of Patent: Jan. 1, 2019

(54) HALBACH ARRAY AND MAGNETIC SUSPENSION DAMPER USING SAME

(71) Applicant: Shanghai Micro Electronics Equipment Co., Ltd., Shanghai (CN)

(72) Inventor: Liwei Wu, Shanghai (CN)

(73) Assignee: SHANGHAI MICRO ELECTRONICS EQUIPMENT (GROUP) CO., LTD., Shanghai (CN)

(*) Notice: Subject to any disclaimer, the term of this patent is extended or adjusted under 35 U.S.C. 154(b) by 415 days.

(21) Appl. No.: 14/910,994

(22) PCT Filed: Aug. 6, 2014

(86) PCT No.: PCT/CN2014/083777
§ 371 (c)(1),
(2) Date: Feb. 8, 2016

(87) PCT Pub. No.: WO2015/018335
PCT Pub. Date: Feb. 12, 2015

(65) Prior Publication Data
US 2016/0197544 A1    Jul. 7, 2016

(30) Foreign Application Priority Data

Aug. 9, 2013 (CN) .......................... 2013 1 0347667

(51) Int. Cl.
*H02K 7/09* (2006.01)
*H02K 49/10* (2006.01)
*H01F 7/02* (2006.01)

(52) U.S. Cl.
CPC ............. *H02K 49/10* (2013.01); *H01F 7/021* (2013.01); *H01F 7/0231* (2013.01); *H01F 7/0278* (2013.01)

(58) Field of Classification Search
CPC .......... H02K 7/09; H02K 49/10; H01F 7/021; H01F 7/0278; H01F 7/0231
See application file for complete search history.

(56) References Cited

U.S. PATENT DOCUMENTS 7,290,642 B2    11/2007  Heiland
8,009,001 B1*   8/2011   Cleveland ................. H02P 6/14
                                              310/156.31
(Continued)

FOREIGN PATENT DOCUMENTS

TW              550352 B      9/2003

*Primary Examiner* — Dang Le
(74) *Attorney, Agent, or Firm* — Muncy, Geissler, Olds & Lowe, P.C.

(57) ABSTRACT

A Halbach magnetic array is disclosed, including a plurality of first and second magnetic units alternately arranged in a width direction, wherein: each first magnetic unit includes first magnetic groups and first magnetic columns alternately arranged in a length direction, each first magnetic group includes four first magnetic bars arranged in a 2*2 matrix; each second magnetic unit includes second magnetic groups and second magnetic columns alternately arranged in the length direction, each second magnetic group includes four second magnetic bars arranged in a 2*2 matrix; each first magnetic column is magnetized in a height direction, and each second magnetic column is magnetized in a direction opposite to the height direction. A magnetic suspension vibration damper is also disclosed.

10 Claims, 8 Drawing Sheets

(56) References Cited

U.S. PATENT DOCUMENTS

| | | | |
|---|---|---|---|
| 8,536,966 B2* | 9/2013 | Fullerton | H01F 7/0284 335/285 |
| 2011/0074231 A1 | 3/2011 | Soderberg | |
| 2011/0169346 A1 | 7/2011 | Evers et al. | |

* cited by examiner

HALBACH ARRAY AND MAGNETIC SUSPENSION DAMPER USING SAME

TECHNICAL FIELD

The present invention relates to the fabrication of semiconductor devices and, more particularly, to a high-precision active magnetic suspension vibration damping apparatus for use in photolithography apparatus.

BACKGROUND

A photolithography apparatus is essentially comprised of a light source (the existing mainstream photolithography apparatus uses ArF-excimer lasers producing ultraviolet (DUV) light with a wavelength of 193 nm), optical illumination systems, projection lenses, a mask stage for holding a mask, a wafer stage for holding a silicon wafer, and vibration damping apparatuses. It requires many important parts, such as metering systems, exposure systems, zero-position sensors, alignment sensors, light intensity sensors and energy sensors, to have minimal vibrations, in order to create a "quiet" environment for some crucial modules. This is because vibrations can pass to a measurement frame to cause undesirable movements thereof, which will in turn disturb metering systems of the wafer and mask stages and thus increase errors in wafer and mask stages and surface errors. As a result, additional errors will be introduced in overlay and critical dimension (CD). Therefore, as one of key devices guaranteeing the performance of integrated circuit fabrication, vibration dampers are typically used to create an internal environment for the important parts inside the photolithography system, which is independently isolated from the external remainder thereof including the basic frame.

Early photolithography apparatuses used rubber dampers. With the theory of using air springs for vibration damping substantiated in the early 1980's, air spring-based passive damping techniques have been used in photolithography apparatuses for this purpose. Currently, most mainstream photolithography apparatuses employ air spring-based active damping techniques and an active controller-based active control strategy. In order for high-precision positioning compensation of a vibration isolation platform, these apparatus mostly use velocity sensors (geophones) for velocity measurement for damping feedback and compensation, position sensors for real-time position measurement of the vibration isolation platform, and voice coil motors for compensation for high bandwidth response. In addition, a gravity compensation means for supporting the vibration isolation platform employs a pneumatic control valve to compensate the pressure of an air bag inflated with compressed air in a real time manner for enabling the vibration dampers to withstand large loads and to effectively isolate and damp vibrations.

Typically, vibration dampers are arranged in a photolithography apparatus in three groups, each equipped with a vertical compensation motor and a horizontal compensation motor, along with a vertical measurement sensor and a horizontal measurement sensor, for vibration damping and isolation in six degrees of freedom, as well as the desirable positioning in the suspended state, of the vibration isolation platform.

Research efforts on vibration dampers aim at achieving a high load-bearing capacity, a low stiffness, a low resonance frequency and a high damping rate. These parameters can result in a low vibration transfer and minimize the influence of external disturbance to the internal environment. However, with the resolution of photolithography systems being continuously improved, more and more strict requirements are being imposed on the critical dimension achievable by the systems. In addition, with the continuous increasing of their throughput as well as the speed and acceleration of their wafer and mask stages, internal modules of photolithography apparatuses have been increasingly complicated and their overall weight has increased to 2-14 tons, even to 40 tons for TFT systems. Therefore, photolithography apparatuses are subjected to increasingly stricter requirements concerning the vibration damping performance of their "quiet" environment, and it is necessary for vibration damping devices to achieve high load-bearing capacities. Further, a concept of "negative stiffness" has been proposed in this art, and some foreign researchers have proposed a number of new vibration damping schemes based on magnetically levitated bearings.

In 2003, IDE (Integrated Dynamics Engineering) Inc. (Germany) filed a patent application (U.S. Pat. No. 7,290,642) for a magnetic spring device with negative stiffness. In this application, it was proposed for the first time to construct a vibration damping device using three permanent magnet poles, any adjacent two of which form a magnetic attractive force, thereby suspending a vibration-damped platform with bi-directional stiffness, as shown in FIG. 1.

In 2009, Professor Lomonova, Eindhoven University of Technology (TU/e), the Netherlands, proposed a passive damping device achieving suspension based on permanent magnet arrays. The device has a structure composed of two stacked magnetic arrays, and each array has a topological structure formed of a planar N-S magnet array. In this device, a vibration-damped platform is suspended based on an upward pulling force exerted by magnet arrays in the upper two layers because of magnetic attractive forces and on an upward thrusting force exerted by magnet arrays in the lower two layers because of magnetic repulsive forces. This device is capable of compensating for a maximum load of thousands of kilograms, and has a spring for vertically supporting the load with a stiffness of dozens of Newton per millimeter, which further assures a low resonance frequency.

While such passive magnetic suspension vibration damping devices are undoubtedly a significant technical advance over the conventional air floatation vibration damping devices, they suffer from inefficient utilization of magnetic energy for magnetic suspension at the same magnetic energy product generated by permanent magnets and relatively significant magnetic leakage, which are significantly detrimental to the application of photolithography apparatuses using them.

SUMMARY OF THE INVENTION

The problem to be solved by the present invention is to provide a high-precision active magnetic suspension vibration damping apparatus which can achieve a higher load-bearing capacity at the same magnetic energy product and produce a magnetic field on one side with characteristics allowing optimized utilization of magnetic energy product.

In order to solve this problem, the present invention provides a Halbach magnetic array, including a plurality of first and second magnetic units alternately arranged in a width direction of the array, wherein: each of the plurality of first magnetic units includes a plurality of first magnetic groups and first magnetic columns alternately arranged in a length direction of the array, each of the plurality of first magnetic groups includes four first magnetic bars arranged in a 2*2 matrix; each of the plurality of second magnetic units includes a plurality of second magnetic groups and second magnetic columns alternately arranged in the length direction of the array, each of the plurality of second magnetic groups includes four second magnetic bars arranged in a 2*2 matrix; each of the plurality of first magnetic columns is magnetized in a height direction of the array, and each of the plurality of second magnetic columns is magnetized in a direction opposite to the height direction of the array.

Each magnetic bar in the first and second magnetic groups may have a magnetization direction along a body diagonal thereof, and wherein the magnetization directions of the four magnetic bars in a same magnetic group have components along the height direction pointing towards a same direction and components in a plane defined by the width and length directions pointing towards different directions.

The magnetization directions of the four first magnetic bars of each of the plurality of first magnetic groups may be opposite to the magnetization directions of the four second magnetic bars of each of the plurality of second magnetic groups.

The magnetization direction of each of the four first magnetic bars may form an angle ranging from 30 degrees to 60 degrees with respect to the plane defined by the width and length directions, the magnetization direction of each of the four second magnetic bars may form an angle ranging from 30 degrees to 60 degrees with respect to the plane defined by the width and length directions.

Each of the plurality of first and second magnetic columns may have a rectangular, circular or other regularly shaped cross section.

The present invention also provides a magnetic suspension vibration damper, including a pair of Halbach magnetic arrays defined above that are stacked together along a height direction to produce a magnetic force in the height direction, wherein the plurality of first magnetic columns in a first array of the first pair of Halbach magnetic arrays are individually aligned with the plurality of second magnetic columns in a second array of the first pair of Halbach magnetic arrays.

The plurality of first magnetic columns in the first array may have magnetization directions same as magnetization directions of corresponding ones of the plurality of second magnetic columns in the second array.

The plurality of first magnetic columns in the first array may have magnetization directions opposite to magnetization directions of corresponding ones of the plurality of second magnetic columns in the second array.

The magnetic suspension vibration damper may further include: a second pair of Halbach magnetic arrays as defined above which are fixedly disposed on a first side of the first pair of Halbach magnetic arrays to produce a magnetic force in a length direction of the first pair of Halbach magnetic arrays; and a third pair of Halbach magnetic arrays as defined above which are fixedly disposed on a second side of the first pair of Halbach magnetic arrays to produce a magnetic force in a width direction of the first pair of Halbach magnetic arrays.

The magnetic force may be a magnetic attractive force or a magnetic repulsive force.

The high-precision active magnetic suspension vibration damping apparatus according to the present invention is based on planar Halbach arrays each having a magnetic density on one side that is $\sqrt{2}$ times of a traditional N-S array. Therefore, the apparatus can achieve a higher load-bearing capacity at the same magnetic energy product and produce a magnetic field on one side with characteristics allowing optimized utilization of magnetic energy product. In addition, the apparatus can also significantly alleviate the issue of magnetic leakage associated with the use of N-S arrays.

DETAILED DESCRIPTION

The high-precision active magnetic suspension vibration damping apparatus according to the present invention is explained in greater detail below on the basis of four exemplary embodiments and FIGS. 2 to 13. All these embodiments are selective embodiments of the present invention and it is to be understood that those skilled in the art can make changes and modifications to them without departing from the spirit and scope of the invention.

Embodiment 1

Figure 2:
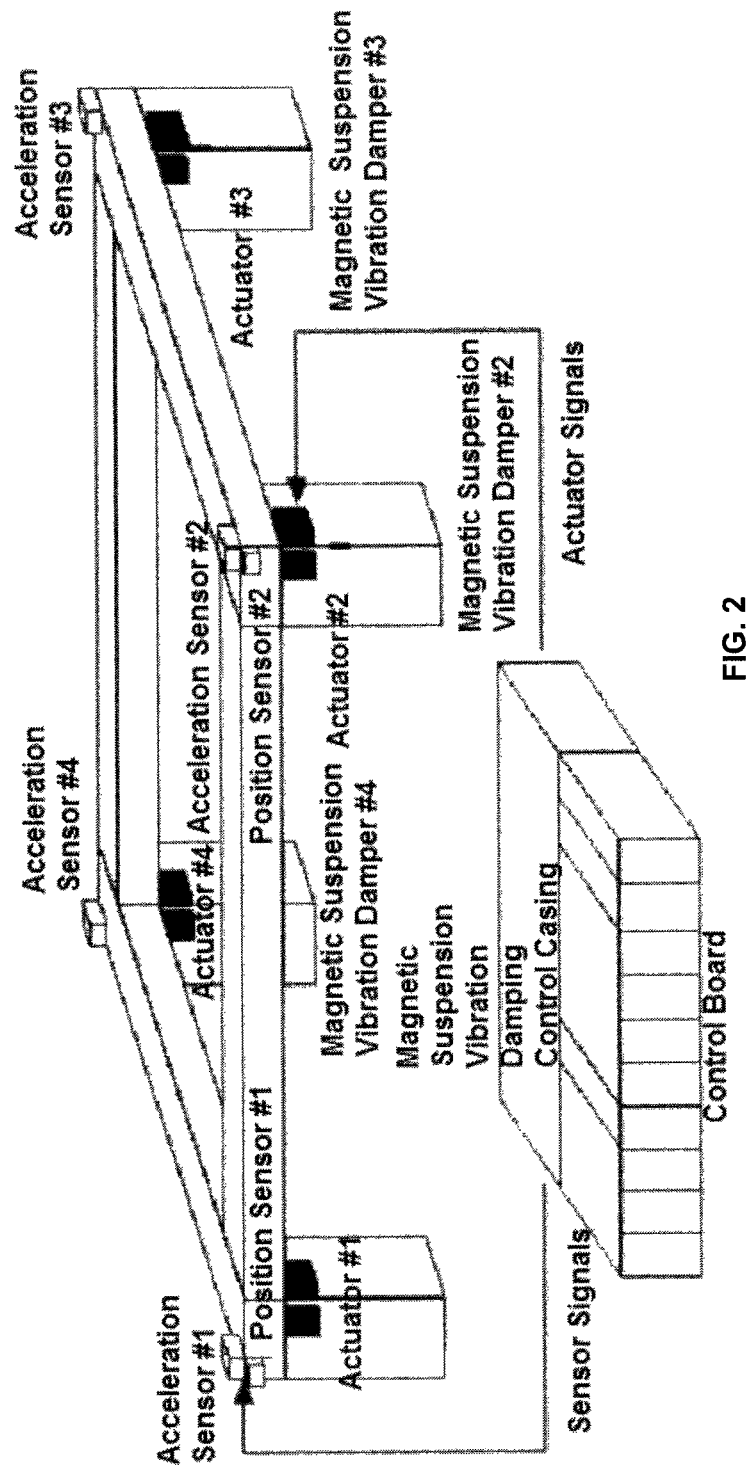
FIG. 2 schematically illustrates a high-precision active magnetic suspension vibration damping apparatus according to the present invention.

The Halbach magnetic array according to the present invention is applicable to various high-precision magnetic suspension vibration damping apparatuses. With the use in a photolithography apparatus as an example, as shown in FIG. 2, this embodiment provides a high-precision active magnetic suspension vibration damping apparatus using Halbach magnetic arrays, configured for vibration damping of a wafer stage. The high-precision active magnetic suspension vibration damping apparatus includes magnetic suspension vibration dampers, a vibration-damped frame, measurement modules, actuator modules, and a controller system. The wafer stage is disposed on the vibration-damped frame which relies on the magnetic suspension vibration dampers for supporting and magnetic suspension vibration damping. Each of the magnetic suspension vibration dampers includes at least two stacked Halbach magnetic arrays which accomplish the supporting and magnetic suspension vibration damping of the vibration-damped frame. The measurement modules and the actuator modules are all in fixed connection with the vibration-damped frame, and the controller system is in communication with the measurement modules and the actuator modules.

As the high-precision active magnetic suspension vibration damping apparatus according to this embodiment is based on planar Halbach magnetic arrays each of which has a magnetic density on one side that is $\sqrt{2}$ times of a traditional N-S array, the apparatus can achieve a higher load-bearing capacity at the same magnetic energy product and produce a magnetic field on one side with characteristics allowing optimized utilization of magnetic energy product. In addition, the apparatus can also significantly alleviate the issue of magnetic leakage associated with the use of N-S arrays. Further, according to the present invention, the measurement modules, the actuator modules, and the controller system form three control loops for dynamic compensation of the vibration-damped frame.

The controller system collects information from the measurement modules and controls the actuator modules to accomplish the dynamic compensation of the vibration-damped frame based on the collected information. The measurement modules include position sensors and acceleration sensors which are all fixedly attached to the vibration-damped frame to measure horizontal and vertical positions and motion accelerations of the vibration-damped frame at the corresponding positions. The actuator modules includes horizontal voice coil motors and vertical voice coil motors, for accomplishing the dynamic compensation of the vibration-damped frame in the three degrees of horizontal freedom and the three degrees of vertical freedom, respectively.

Specifically, the high-precision active magnetic suspension vibration damping apparatus according to this embodiment includes the vibration-damped frame which is supported by four (at least three) magnetic suspension vibration dampers for its vibration damping. The vibration-damped frame is provided with an interface compatible with and supporting the wafer stage of the photolithography apparatus. The wafer stage is mounted on the vibration-damped frame.

The vibration damping apparatus further includes:

the measurement modules, including the position sensors and acceleration sensors, each position sensor, together with one of the acceleration sensors, being attached to one of the magnetic suspension vibration dampers, for measuring horizontal and vertical positions and motion accelerations of the vibration-damped frame at the corresponding positions;

the actuator modules, including horizontal voice coil motors and vertical voice coil motors, each horizontal voice coil motor, together with one of the vertical voice coil motors, being provided to one of the magnetic suspension vibration dampers, for accomplishing the dynamic compensation of the vibration-damped frame in the three degrees of horizontal freedom and the three degrees of vertical freedom, respectively; and the controller system, including a control board, a control casing, power amplifiers, a measurement conditioning board, interface connections, etc.

In application, as different two-dimensional spatial arrangements of the stacked Halbach magnetic arrays will result in different magnetic circuits and hence different distributions of magnetic flux density and uniformity, an analysis is first performed to assess magnetic fields generated by the vibration dampers with different structures, which takes into account the magnetic energy product characteristics of the magnetic arrays, magnetic gap (suspension height), load, damping stiffness, resonance frequency, magnetic flux area, dimensions, etc. Design of magnetic suspension vibration dampers with a favorable structure and dimensional parameters is then determined. In addition, as extremely high requirements are imposed on magnetic leakage for their use in photolithography apparatus, a peripheral magnetic field generated by the magnetic suspension vibration dampers is also taken into account in their structural design and in the aforementioned analysis. With the determined load, suspension height, vibration damping structure and dimensional parameters, static magnetic repulsion formulas are step up to evaluate the impact of changes in magnetic flux, magnetic gap and planar magnetic array dimensions on the resulting magnetic repulsive force and load-bearing capacity and to thereby obtain the following parameters and information about the magnetic suspension vibration damping apparatus:

1) key dimensional parameters of the planar magnetic arrays;
2) a relationship between the magnetic repulsive force and the suspension height for a nominal load;
3) a relationship between the suspension stiffness and the load; and
4) a relationship between the vibration damper stiffness and the disturbance.

The vibration damping apparatus according to the present invention includes three control loops, i.e., 1) a position control loop, involving: the multiple position sensors measuring relative positional changes occurring in each magnetic suspension vibration damper; sensor arrays converting positions on physical axes to positions on logic axes; the controller system conditioning the positions on logic axes and actuator arrays converting the positions on logic axes to current signals indicative of forces to be output from individual physical actuators; and performing D/A conversion and power amplification on the current signals and inputting the resulting signals to the horizontal voice coil motors and vertical voice coil motors for dynamic position compensation, 2) an inertia feedback loop, involving: the multiple acceleration sensors detecting acceleration signals from the vibration-damped frame; converting the acceleration signals into accelerations on logic axes by normalization, conditioning, filtering and A/D conversion; and conditioning the accelerations with controllers and compensators and applying the conditioned accelerations to the position control loop, and 3) a feedforward loop, involving: feeding positions of the vibration-damped frame during its motion forward to the magnetic suspension vibration dampers which in turn performs centroid compensation based on the fed positions to eliminate the consequences of variations in the performance of the magnetic suspension vibration dampers and in the overall center of mass of the vibration-damped frame, caused by reaction forces generated during motions of the wafer and mask stages of the photolithography apparatus.

Figure 3:
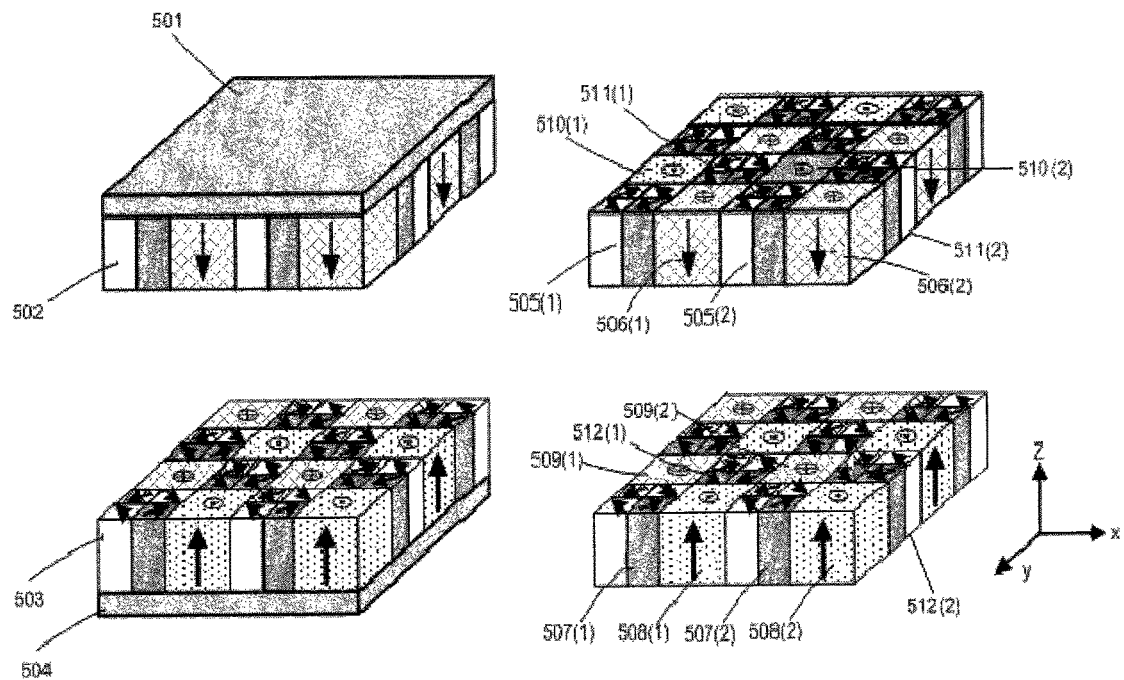
FIG. 3 schematically illustrates a magnetic suspension vibration damper in accordance with a first embodiment of the present invention.

Turning now to FIG. 3, the two stacked Halbach magnetic arrays is consisted of a first planar magnetic array 502 and a second planar magnetic array 503. The first planar magnetic array 502 is in fixed connection with the vibration-damped frame, while the second planar magnetic array 503 is fixed to the ground or a stator (e.g., a portion of a ground support or another support means). The supporting or magnetic suspension vibration damping is accomplished by a magnetic attractive or repulsive force exerted by the first planar magnetic array 502 and the second planar magnetic array 503. The first planar magnetic array 502 and the second planar magnetic array 503 are fixed to the vibration-damped frame and the ground or stator by means of two respective back-ion portions 501 and 504. Both of the first planar magnetic array 502 and the second planar magnetic array 503 are configured parallel to a plane of the vibration-damped frame. In general terms, the plane is a horizontal plane. The back-ion portion 501 is stacked above the first planar magnetic array 502 along a third direction, while the back-ion portion 504 is stacked under the second planar magnetic array 503 along the third direction. The back-ion portions 501 and 504 both have a thickness ranging from 2 mm to 20 mm and are formed of a high magnetic permeability material.

Each of the first and second planar magnetic arrays 502 and 503 is comprised of first and second magnetic units alternately arranged in a second direction. Each of the first magnetic units is comprised of magnetic groups and magnetic columns alternately arranged in a first direction, and each of the second magnetic units is comprised of magnetic columns and magnetic groups alternately arranged in the first direction. The magnetic groups and magnetic columns in the first magnetic unit are configured to be connected to the corresponding magnetic columns and magnetic groups in the second magnetic unit along the second direction. The magnetic groups match in size the magnetic columns. The first and second direction cross each other at right angles and both extend within the horizontal plane. Each of the magnetic groups is comprised of four equally-sized magnetic bars that are arranged closely to one another in a 2*2 matrix. In this embodiment, each of the magnetic bars has a square-shaped cross section and has body diagonals each forming angle of 30 degrees to 60 degrees with respect to the horizontal plane.

In this embodiment, each of the first and second planar magnetic arrays 502 and 503 has a topological structure resembling that of a Halbach magnetic array. That is, each of the first and second planar magnetic arrays is comprised of magnetic units arranged in the first and second directions. The first direction may be defined as a horizontal X direction, the second direction as a horizontal Y direction, and the third direction as a vertical Z direction, i.e., the longitudinal direction. In this embodiment, the first and second planar magnetic arrays 502 and 503 have opposite magnetic orientations.

Specifically, referring to FIG. 3, in a first magnetic unit of the first planar magnetic array, magnetic groups 505 and magnetic columns 506 are alternately arranged in the X direction. As illustrated in the figure, a magnetic group 505 (2) and a magnetic group 505 (1) are identical magnetic groups, and a magnetic column 506 (1) and a magnetic column 506 (2) are identical magnetic columns. In specific embodiments, the number of periodical pairs of a magnetic group 505 and a magnetic column 506 is not limited to two, and it may be construed that the first magnetic unit includes further magnetic groups 505 and magnetic columns 506 alternately arranged in the X direction. In a second magnetic unit of the first planar magnetic array, magnetic columns 510 and magnetic groups 511 are alternately arranged in the X direction. As illustrated in the figure, a magnetic group 511 (2) and a magnetic group 511 (1) are identical magnetic groups, and a magnetic column 510 (1) and a magnetic column 510 (2) are identical magnetic columns. In specific embodiments, the number of periodical pairs of a magnetic group 511 and a magnetic column 510 is not limited to two, and it may be construed that the second magnetic unit includes further magnetic groups 511 and magnetic columns 510 alternately arranged in the X direction. The magnetic groups 511 in the second magnetic unit correspond to the magnetic columns 506 in the first magnetic unit along the Y direction, and the magnetic columns 510 in the second magnetic unit correspond to the magnetic groups 505 in the first magnetic unit along the Y direction. The first and second magnetic units are alternately arranged in the Y direction to form the first planar magnetic array.

In the second planar magnetic array 503, a first magnetic unit, as well as magnetic columns 508 and magnetic groups 507 therein, corresponds to the first magnetic unit of the first planar magnetic array 502, and a second magnetic unit, as well as magnetic columns 509 and magnetic groups 512 therein, corresponds to the second magnetic unit of the first planar magnetic array 502.

Figure 4:
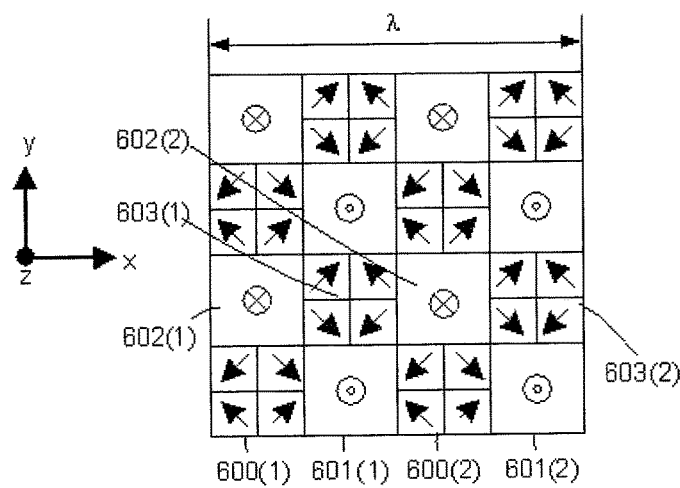
FIG. 4 schematically illustrates an alternative design of the magnetic suspension vibration damper in accordance with the first embodiment of the present invention.
Figure 5:
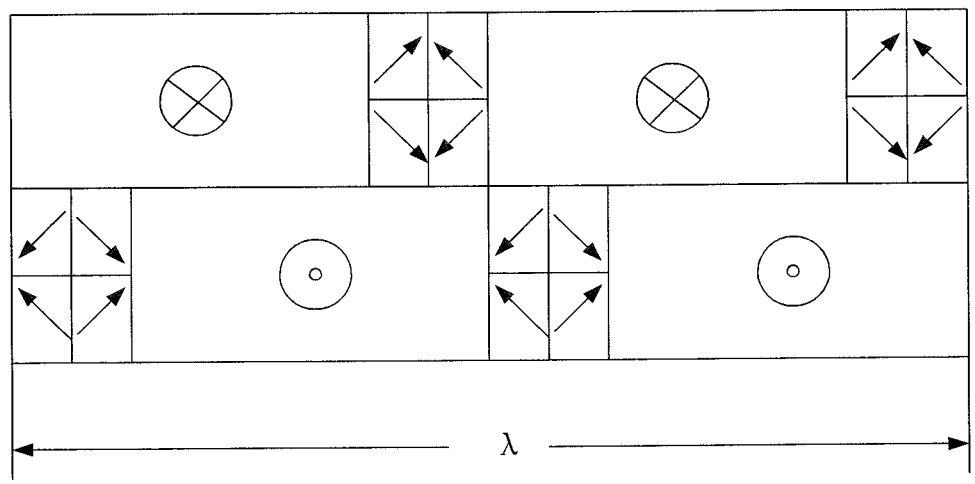
FIG. 5 schematically illustrates an alternative design of the magnetic suspension vibration damper of FIG. 4.

In this embodiment, referring to FIG. 4, in conjunction with FIG. 3, with the case of the first planar magnetic array as an example, the magnetic columns in the first and second magnetic units are magnetized in a direction extending perpendicularly downward. That is, the magnetic columns 601 (i.e., the magnetic columns 506 in FIG. 3) each have a magnetization direction extending perpendicularly downward. In addition, each of the magnetic bars of the first magnetic unit is magnetized obliquely downward along one of its body diagonals. That is, magnetic bars in the magnetic groups 600 (i.e., the magnetic groups 505 in FIG. 3) are all magnetized obliquely downward along their body diagonals. Reference may be made to a magnetic group 600 shown in FIG. 6 for more details in this regard. FIGS. 4 and 5 show only components in the horizontal plane of magnetization directions of the magnetic bars in the magnetic groups. The magnetization directions of the magnetic columns and the magnetic bars in the second magnetic unit are opposite to the respectively magnetization directions of the magnetic columns and the magnetic bars in the first magnetic unit. That is, as shown in FIG. 4, the magnetic columns 602 are magnetized oppositely to the magnetic columns 601, and the magnetic bars in the magnetic groups 603 are magnetized oppositely to the magnetic bars in the magnetic groups 600. More details about the magnetization directions can be obtained by referring to the following description of a comparison between magnetic groups 600 and 603 made in conjunction with FIG. 6.

Figure 6:
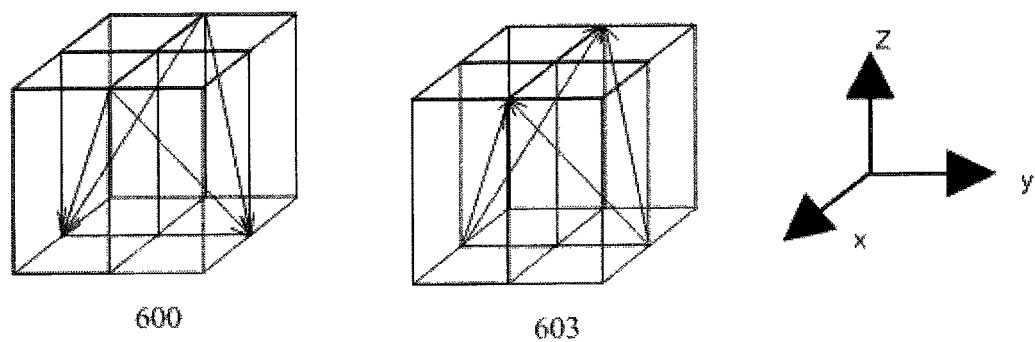
FIG. 6 is a schematic illustration of magnetic groups in accordance with the first embodiment of the present invention.

Referring to FIG. 6, magnetization directions of four magnetic bars in the same magnetic group have their components within the horizontal plane pointing toward four different directions. As the magnetization directions of the magnetic bars are along their body diagonals, their components in the horizontal plane are surely superimposed over the two diagonal lines of the end surface of the magnetic group, which point toward totally four directions. Therefore, the components of the magnetization directions of the four magnetic bars in the same magnetic group point toward the aforementioned respective four directions. The four directions are not limited to any specific distribution pattern, such as, for example, those shown in FIGS. 4 and 5, any distribution pattern that meets the foregoing criterion is considered within the spirit and scope of the present invention.

In this embodiment, the magnetic columns and magnetic bars of the first planar magnetic array are equidirectionally magnetized with the corresponding magnetic columns and magnetic bars of the second planar magnetic array. Therefore, a magnetic repulsive force is generated between the two planar magnetic arrays.

Referring to FIG. 4, the first and second magnetic units have a periodic length of λ along the first direction. Each first magnetic group 600 of the first magnetic unit has a width in the range of from λ/8 to λ/4, and each second magnetic column 601 of the first magnetic unit has a width ranging from λ/4 to 3λ/8. Each first magnetic group 603 of the second magnetic unit has a width in the range of from λ/8 to λ/4, and each second magnetic column 602 of the first magnetic unit has a width ranging from λ/4 to 3λ/8. While it has been shown in FIG. 4 that the magnetic groups and magnetic columns each have a width of λ/4 and the magnetic columns each have a square cross section, the present invention is not limited in this regard as the magnetic columns may also have rectangular, circular or regularly shaped cross sections. FIG. 5 shows an instance in which each magnetic group has a width of λ/8, and each magnetic column has a width of 3λ/8 and a rectangular cross section.

In implementation of the high-precision active magnetic suspension vibration damping apparatus according to the embodiment shown in FIG. 4, the following parameters can be obtained by simulation and calculation: a magnetic flux density of 1.24 T, and a periodic length of 40 mm of the first and second magnetic units in the first direction, wherein widths of the first magnetic groups 600 and 603 and the second magnetic columns 601 and 602 are all given as λ/4. The simulation data demonstrate that a magnetic field strength greatly higher than that created by magnetic flux on the surface of a single magnetic body has been produced between the first and second planar magnetic arrays.

Figure 7:
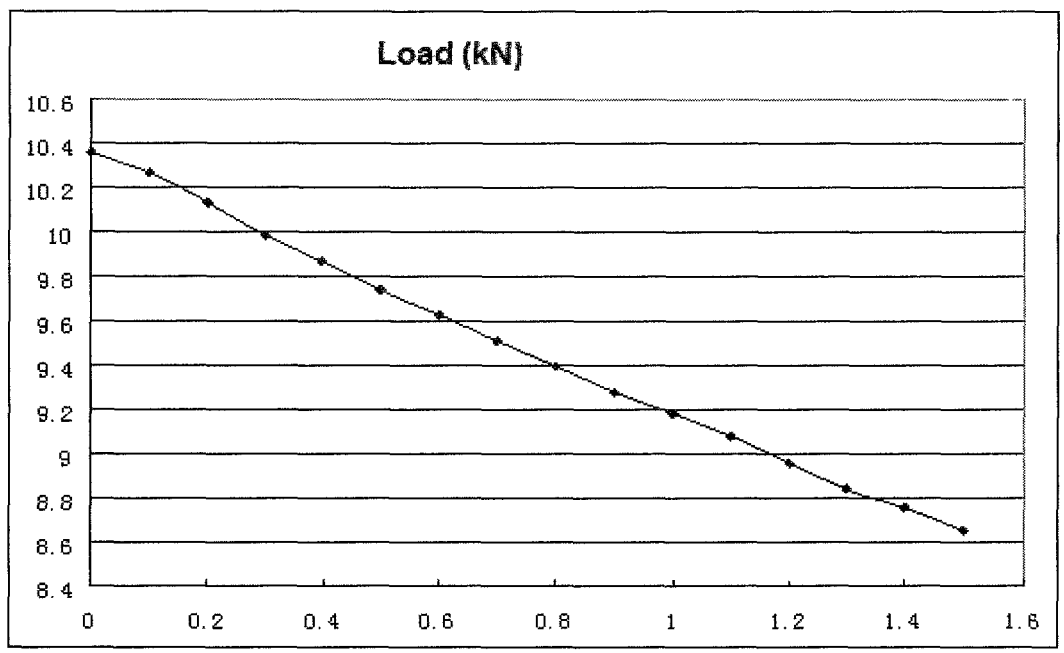
FIG. 7 shows a curve of a magnetically suspendable load vs. a suspension height of a high-precision active magnetic suspension vibration damping apparatus constructed in accordance with the first embodiment of the present invention varying from zero to 1.5 mm.
Figure 8:
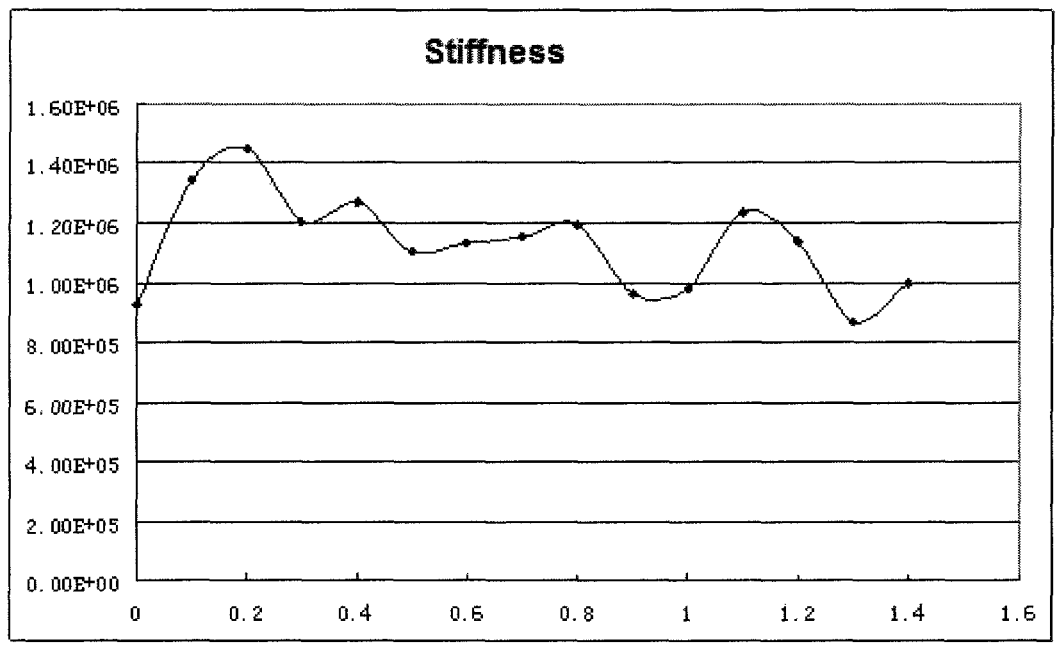
FIG. 8 shows a curve of suspension stiffness of the high-precision active magnetic suspension vibration damping apparatus constructed in accordance with the first embodiment of the present invention.
Figure 9:
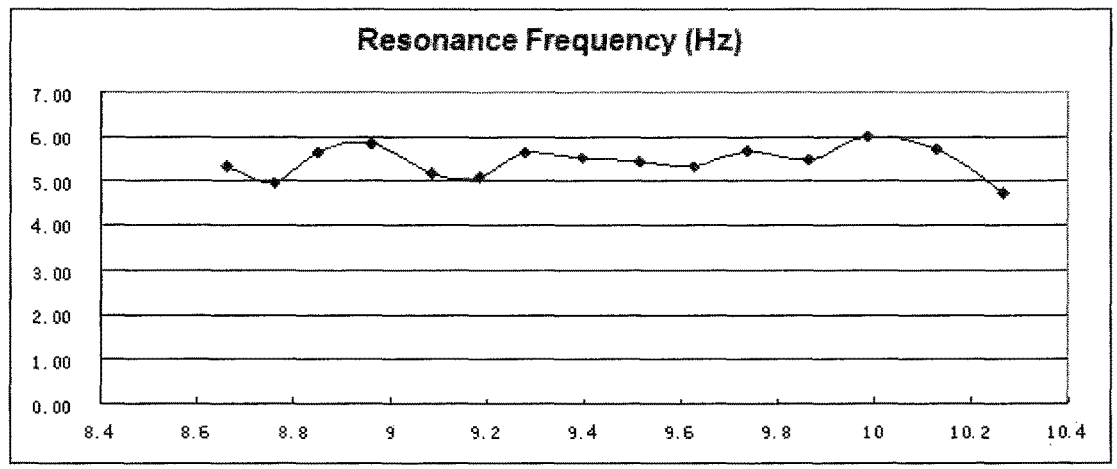
FIG. 9 shows a curve of resonance frequency of the high-precision active magnetic suspension vibration damping apparatus constructed in accordance with the first embodiment of the present invention.

FIG. 7 shows a curve of a magnetically suspendable load at predetermined parameters vs. a suspension height between the first and second planar magnetic arrays varying from zero to 1.5 mm. As illustrated, the bearable load at the above parameters ranges from 8.60 kN to 10.38 kN. FIG. 8 shows a curve of the corresponding suspension stiffness, which is averaged at 1.13E6 N/m. FIG. 9 shows a curve of the corresponding resonance frequency, which ranges from 5 Hz to 6 Hz vs. a suspended load varying from 8.6 kN to 10.3 kN. Therefore, a low resonance frequency is provided to the vibration-isolated platform.

Embodiment 2

Figure 10:
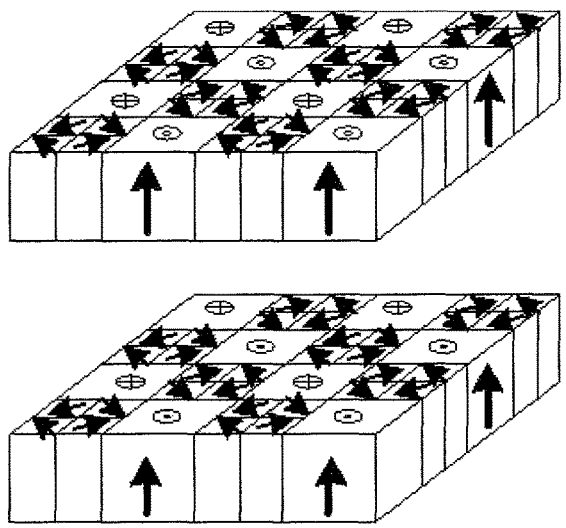
FIG. 10 is a schematic illustration of a magnetic suspension vibration damper in accordance with a second embodiment of the present invention.
Figure 11:
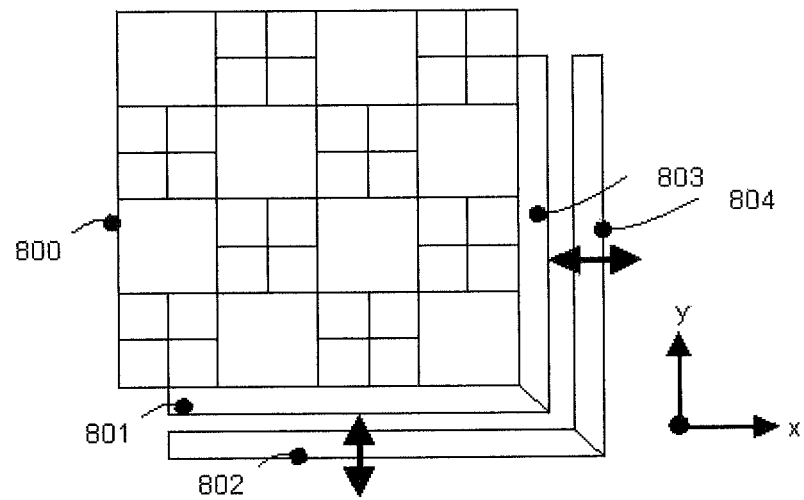
FIG. 11 is a schematic illustration of a magnetic suspension vibration damper in accordance with a third embodiment of the present invention.

This embodiment differs from Embodiment 1 majorly in that, as shown in FIG. 10, the upper magnetic array is the first planar magnetic array, the lower magnetic array is the second planar magnetic array, and the magnetization directions of the magnetic columns and the magnetic bars in the first planar magnetic array are opposite to the magnetization directions of the corresponding magnetic columns and magnetic bars in the second planar magnetic array, thereby achieving magnetic suspension vibration damping by a magnetic attractive force. Reference can be made to FIG. 2 for detailed structural configuration of the two planar magnetic arrays, the measurement modules, the actuator modules and the controller system in this embodiment, which are similar to those of Embodiment 1.

In implementation of the high-precision active magnetic suspension vibration damping apparatus according to this embodiment, the following parameters can be obtained by simulation and calculation: a magnetic flux density of 1.24 T, and a periodic length of 40 mm of the first and second magnetic units in the first direction, wherein widths of the first magnetic groups and the second magnetic columns are all given as λ/4. The simulation data demonstrate that a magnetic field strength greatly higher than that created by magnetic flux on the surface of a single magnetic body has been produced between the first and second planar magnetic arrays.

Embodiment 3

This embodiment is a modification of Embodiment 1. Specifically, referring to FIG. 11, a first-directional first magnetic array 803 and a second-directional first magnetic array 801 are disposed external to respective two adjoined sides of the first planar magnetic array, and a first-directional second magnetic array 804 and a second-directional second magnetic array 802 are disposed external to respective two adjoined sides of the second planar magnetic array. The first-directional first magnetic array 803 forms a magnetic attractive or repulsive force with the first-directional second magnetic array 804 only in the first direction, while the second-directional second magnetic array 802 forms a magnetic attractive or repulsive force with the second-directional first magnetic array 801 only in the second direction. The magnetic arrays 801 to 804 have the same structure as the magnetic array 800, and their only difference is that they are deployed at different positions. In this embodiment, the first direction is defined as the X direction, and the second direction as the Y direction. The attractive or repulsive forces horizontally isolate the vibration-damped frame from external vibrations.

In this embodiment, the second planar magnetic array is fixed to the ground or the stator by means of a back-ion portion, and the first-directional second magnetic array and the second-directional second magnetic array are both fixedly attached to the back-ion portion. This creates a space allowing the horizontal vibration isolation.

Embodiment 4

Figure 1:
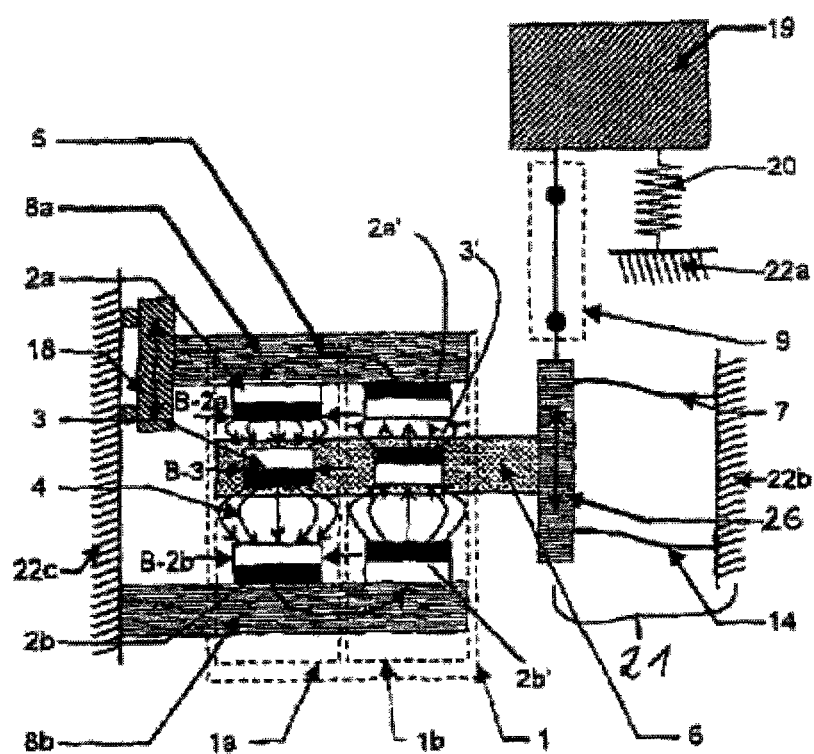
FIG. 1 schematically illustrates a vibration damping apparatus of the prior art.
Figure 12:
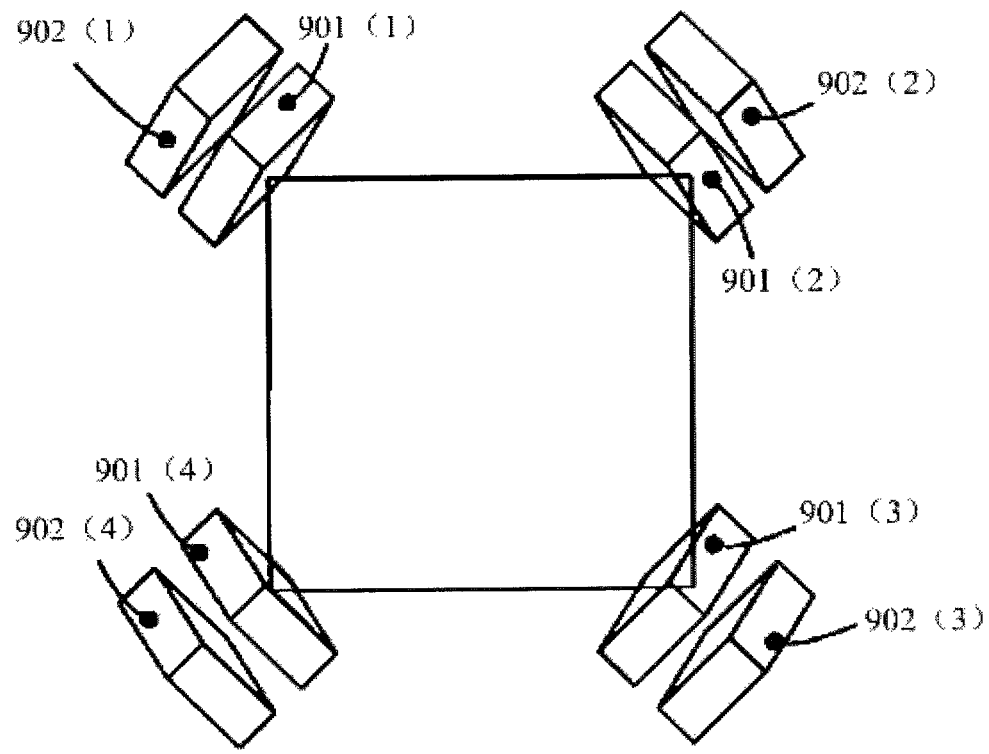
FIGS. 12 and 13 are schematic illustrations of a magnetic suspension vibration damper in accordance with a fourth embodiment of the present invention.
Figure 13:
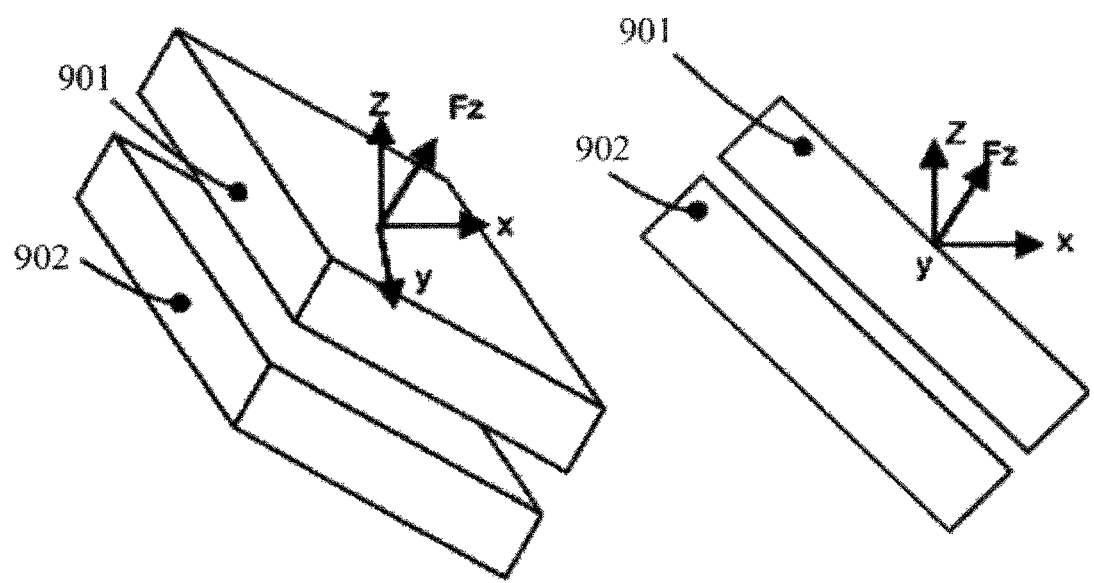

Referring to FIGS. 12 and 13, both the first planar magnetic array 901 and the second planar magnetic array 902 are tilted with respect to the plane of the vibration-damped frame. The first planar magnetic array is mounted on the vibration-damped frame and includes 901 (1), 901 (2), 901 (3) and 901 (4). The second planar magnetic array is mounted on the stator or ground and includes 902 (1), 902 (2), 902 (3) and 902 (4). This embodiment can be considered as a modification of Embodiment 1. In Embodiment 1, the two planar magnetic arrays are both arranged parallel to the vibration-damped frame, and thus can be considered as being horizontally arranged. This embodiment can be considered as a variant of Embodiment 1, in which the two planar magnetic arrays are tilted and then attached respectively to the vibration-damped frame and the stator or ground. The high-precision active magnetic suspension vibration damping apparatus according to this embodiment can be obtained in a similar way by referencing FIG. 2, and differs from that of FIG. 2 only in the manner of connecting the magnetic suspension vibration dampers to other parts. In addition, reference can be made to FIGS. 1 to 3 for the internal structure of its magnetic suspension vibration dampers.

Referring to FIG. 13, the X and Y directions in this embodiment both extend in the horizontal plane, i.e., the first and second directions of Embodiment 1, respectively, and the Z direction is the vertical direction. In this embodiment, each of the magnetic suspension vibration dampers is angularly disposed at one of the four corners of the vibration-damped frame. Each of the magnetic suspension vibration dampers is tilted at angle that is smaller than 90 degrees with respect to the X direction. Each of the magnetic suspension vibration dampers is also tilted at angle that is smaller than 90 degrees with respect to the Y direction. The two planar magnetic arrays generate a suspension force Fz that is orthogonal to an upper surface of the first planar magnetic array 901. The direction of the force Fz forms an angle of smaller than 90 degrees with the X direction, an angle of smaller than 90 degrees with the Y direction, and an angle of smaller than 90 degrees with the Z direction.

As described above, in various embodiments, the present invention provides a vibration damping structure construct based upon two stacked magnetic arrays. The magnetic arrays may either have the same magnetic orientation to entail a magnetic attraction based damping structure, or have opposite magnetic orientations to entail a magnetic repulsion based damping structure. The present invention provides an auxiliary horizontal vibration isolation apparatus based on magnet arrays which produce attractive or repulsive forces. The present invention employs voice coil motors as open-loop feedforward actuating mechanisms for accurate compensation and control of the vibration-damped frame, which are capable of not only accurate compensation of position of the vibration-damped frame but also compensation for drifts in centroid position caused by movements of the wafer and mask stages disposed inside a photolithography apparatus. The present invention also employs acceleration sensors, velocity sensors and position sensors as measurement instruments for stiffness and damping compensation in various degrees of freedom for the accurate control and compensation of the vibration-damped platform of the photolithography apparatus.

This embodiment provides a high-precision active magnetic suspension vibration damping apparatus based on planar Halbach magnetic arrays, which further offers the following advantages:

1) it has a small profile and a high load-bearing capacity and can meet the needs of nanometer-scale photolithography for a high load-bearing capacity, a low stiffness and a high-precision positioning;

2) it takes the advantage of the fact that a Halbach magnetic array has a magnetic density on one side that is $\sqrt{2}$ times of a traditional N-S array to achieve a high load-bearing capacity at the same magnetic energy product;

3) it produces a magnetic field on one side with characteristics allowing optimized utilization of magnetic energy product and can significantly alleviate the issue of magnetic leakage; and 4) it employs voice coil motors as open-loop feedforward actuating mechanisms, which are capable of not only accurate compensation of position of the vibration-damped frame but also compensation for drifts in centroid position caused by movements of the wafer and mask stages disposed inside a photolithography apparatus.

What is claimed is:

1. A Halbach magnetic array, comprising a plurality of first and second magnetic units alternately arranged in a width direction of the array, wherein:
   each of the plurality of first magnetic units comprises a plurality of first magnetic groups and first magnetic columns alternately arranged in a length direction of the array, each of the plurality of first magnetic groups includes four first magnetic bars arranged in a 2*2 matrix;
   each of the plurality of second magnetic units comprises a plurality of second magnetic groups and second magnetic columns alternately arranged in the length direction of the array, each of the plurality of second magnetic groups includes four second magnetic bars arranged in a 2*2 matrix;
   each of the plurality of first magnetic columns is magnetized in a height direction of the array, and each of the plurality of second magnetic columns is magnetized in a direction opposite to the height direction of the array.

2. The Halbach magnetic array according to claim 1, wherein each magnetic bar in the first and second magnetic groups has a magnetization direction along a body diagonal thereof, and wherein the magnetization directions of the four magnetic bars in a same magnetic group have components along the height direction pointing towards a same direction and components in a plane defined by the width and length directions pointing towards different directions.

3. The Halbach magnetic array according to claim 2, wherein the magnetization directions of the four first magnetic bars of each of the plurality of first magnetic groups are opposite to the magnetization directions of the four second magnetic bars of each of the plurality of second magnetic groups.

4. The Halbach magnetic array according to claim 3, wherein the magnetization direction of each of the four first magnetic bars forms an angle ranging from 30 degrees to 60 degrees with respect to the plane defined by the width and length directions, and the magnetization direction of each of the four second magnetic bars forms an angle ranging from 30 degrees to 60 degrees with respect to the plane defined by the width and length directions.

5. The Halbach magnetic array according to claim 1, wherein each of the plurality of first and second magnetic columns has a rectangular, circular or other regularly shaped cross section.

6. A magnetic suspension vibration damper, comprising a first pair of Halbach magnetic arrays as defined in claim 1 that are stacked together along a height direction to produce a magnetic force in the height direction, wherein the plurality of first magnetic columns in a first array of the first pair of Halbach magnetic arrays are individually aligned with the plurality of second magnetic columns in a second array of the first pair of Halbach magnetic arrays.

7. The magnetic suspension vibration damper according to claim 6, wherein the plurality of first magnetic columns in the first array have magnetization directions same as magnetization directions of corresponding ones of the plurality of second magnetic columns in the second array.

8. The magnetic suspension vibration damper according to claim 6, wherein the plurality of first magnetic columns in the first array have magnetization directions opposite to magnetization directions of corresponding ones of the plurality of second magnetic columns in the second array.

9. The magnetic suspension vibration damper according to claim 6, further comprising:
   a second pair of Halbach magnetic arrays which are fixedly disposed on a first side of the first pair of Halbach magnetic arrays to produce a magnetic force in a length direction of the first pair of Halbach magnetic arrays; and
   a third pair of Halbach magnetic arrays which are fixedly disposed on a second side of the first pair of Halbach magnetic arrays to produce a magnetic force in a width direction of the first pair of Halbach magnetic arrays.

10. The magnetic suspension vibration damper according to claim 9, wherein the magnetic force is a magnetic attractive force or a magnetic repulsive force.

* * * * *